(12) United States Patent
Suzuki

(10) Patent No.: US 11,368,599 B2
(45) Date of Patent: Jun. 21, 2022

(54) IMAGE PROCESSING METHOD, APPARATUS, AND RECORDING SYSTEM DETERMINING WHEN TO GENERATE BLACK DOTS AFTER RESOLUTION REDUCTION

(71) Applicant: SEIKO EPSON CORPORATION, Tokyo (JP)

(72) Inventor: Masato Suzuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/365,224

(22) Filed: Jul. 1, 2021

(65) Prior Publication Data

US 2022/0006918 A1 Jan. 6, 2022

(30) Foreign Application Priority Data

Jul. 3, 2020 (JP) .............................. JP2020-115458

(51) Int. Cl.
| | | |
|---|---|---|
| *H04N 1/393* | (2006.01) | |
| *B41J 2/21* | (2006.01) | |
| *G06K 15/10* | (2006.01) | |
| *H04N 1/60* | (2006.01) | |
| *H04N 1/191* | (2006.01) | |
| *H04N 1/034* | (2006.01) | |
| *G06K 15/02* | (2006.01) | |

(52) U.S. Cl.
CPC .......... *H04N 1/3935* (2013.01); *B41J 2/2132* (2013.01); *G06K 15/102* (2013.01); *G06K 15/1877* (2013.01); *H04N 1/034* (2013.01); *H04N 1/1917* (2013.01); *H04N 1/6069* (2013.01)

(58) Field of Classification Search
CPC ...... H04N 1/034; H04N 1/191; H04N 1/1911; H04N 1/1916; H04N 1/1917; H04N 1/393; H04N 1/3935; G06K 15/102; G06K 15/1876; G06K 15/1877; B41J 2/2132
See application file for complete search history.

(56) References Cited

FOREIGN PATENT DOCUMENTS

| JP | 2000-198237 A | 7/2000 |
|---|---|---|
| JP | 2001-146032 A | 5/2001 |
| JP | 2007-036560 A | 2/2007 |

*Primary Examiner* — Scott A Rogers
(74) *Attorney, Agent, or Firm* — Global IP Counselors, LLP

(57) ABSTRACT

An image processing method is an image processing method of a recording device. The image processing method includes inputting the image data having a resolution in a sub scanning direction of X×N dpi, performing data processing on the image data for each N-unit region, performing resolution reduction processing of reducing, to 1/N, a resolution in the sub scanning direction, and generating a recording data based on the reduced image data. In the data processing step, when the N-unit region is formed of a pixel having a black gradation value and a pixel having a gradation value that is equal to or greater than a predetermined value when expressed by RGB, and the pixel having the black gradation value is consecutive from another N-unit region adjacent to the N-unit region, a black dot is generated in a pixel after the resolution reduction processing.

4 Claims, 12 Drawing Sheets

IMAGE PROCESSING METHOD, APPARATUS, AND RECORDING SYSTEM DETERMINING WHEN TO GENERATE BLACK DOTS AFTER RESOLUTION REDUCTION

The present application is based on, and claims priority from JP Application Serial Number 2020-115458, filed Jul. 3, 2020, the disclosure of which is hereby incorporated by reference herein in its entirety.

BACKGROUND

1. Technical Field

The present disclosure relates to an image processing method, an image processing device, and a recording system.

2. Related Art

In the related art, a printer has been known that includes, in a recording head, a first nozzle row in which a group of nozzles for a black ink is arranged in a sub scanning direction and a second nozzle row in which a group of nozzles for a plurality of colors of color inks is arranged in the sub scanning direction. JP-A-2001-146032 discloses a recording head in which nozzle pitches of two nozzle rows are the same and nozzle positions in the sub scanning direction are offset from each other in a staggered manner.

For example, when the nozzle pitches of the first nozzle row and the second nozzle row are 300 dpi, a resolution of the printer including the recording head described above is 300 dpi between the black inks, is 300 dpi between the color inks, and is 600 dpi between the black ink and the color ink. Further, for example, when an input image having a resolution of 600 dpi being reduced to 300 dpi is recorded, there is a technique for averaging and reducing a color of a pixel included in a unit region. When a black ruled line is recorded by using the processing, a black ruled line being originally recorded at a 300 dpi interval by using the black ink nozzle row may be recorded at a 200 dpi interval by using the black ink nozzle row and the color ink nozzle row. In other words, there has been a risk a black ruled line may be visible to be thicker than an original width.

SUMMARY

An image processing method is an image processing method for generating, based on image data, recording data for a recording device including a recording head in which a first nozzle row and a second nozzle row are arranged in a staggered manner, the first nozzle row including a group of nozzles for a black ink that are aligned at an interval of X dpi and arranged in a sub scanning direction, the second nozzle row including a group of nozzles for a plurality of color inks that are aligned at an interval of X dpi and arranged in the sub scanning direction. The image processing method includes inputting the image data having a resolution in the sub scanning direction of X×N dpi, performing data processing on the image data for each N-unit region, performing resolution reduction processing of reducing, to 1/N, a resolution in the sub scanning direction in the image data on which the data processing is performed, and generating the recording data based on the image data having a resolution reduced, wherein, in the data processing, when the N-unit region is formed of a pixel having a black gradation value and a pixel having a gradation value that is equal to or greater than a predetermined value when expressed by RGB, and the pixel having the black gradation value is consecutive from another N-unit region adjacent to the N-unit region, processing of generating a dot of the black ink in a pixel after the resolution reduction processing is performed.

An image processing device is configured to generate, based on image data, recording data for a recording device including a recording head in which a first nozzle row and a second nozzle row are arranged in a staggered manner, the first nozzle row including a group of nozzles for a black ink that are aligned at an interval of X dpi being arranged in a sub scanning direction, the second nozzle row including a group of nozzles for a plurality of color inks that are aligned at an interval of X dpi and arranged in the sub scanning direction. The image processing device includes an input unit configured to receive an input of the image data having a resolution in the sub scanning direction of X×N dpi, and a control unit configured to perform data processing on the image data for each N-unit region, perform resolution reduction processing of reducing, to 1/N, a resolution in the sub scanning direction in the image data on which the data processing is performed, and generate the recording data based on the image data having a resolution reduced, wherein, when the N-unit region is formed of a pixel having a black gradation value and a pixel having a gradation value that is equal to or greater than a predetermined value when expressed by RGB, and the pixel having the black gradation value is consecutive from another N-unit region adjacent to the N-unit region, the control unit performs processing of generating a dot of the black ink in a pixel after the resolution reduction processing.

A recording system includes the image processing device described above, and a recording device configured to perform recording on a recording medium based on the recording data generated by the image processing device.

DESCRIPTION OF EXEMPLARY EMBODIMENTS

1. Embodiment

An image processing method, an image processing device, and a recording system according to the exemplary embodiment will be described.

Figure 1:
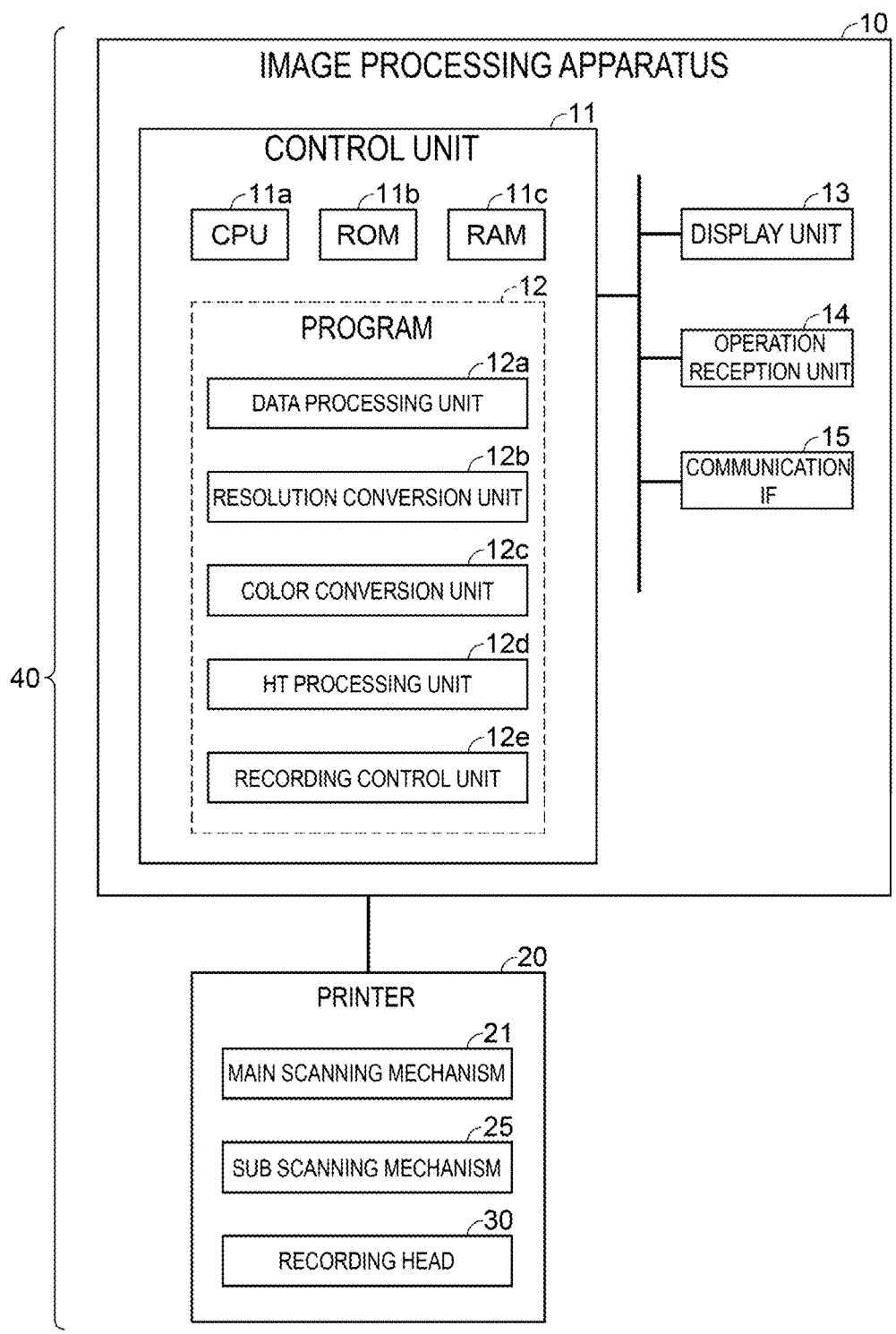
FIG. 1 is a block diagram illustrating a configuration of a recording system according to an exemplary embodiment.

1-1. Schematic Description of Apparatus:

As illustrated in FIG. 1, a recording system 40 includes an image processing device 10 and a printer 20 as a recording device. The recording system 40 may be referred to as a system, an image processing system, a printing system, or the like. The image processing method is realized by at least part of the recording system 40.

The image processing device 10 is realized by, for example, a personal computer, a server, a smartphone, a tablet terminal, or an information processing device having about the same processing capability as that of the personal computer, the server, the smartphone, and the tablet terminal. The image processing device 10 includes a control unit 11, a display unit 13, an operation reception unit 14 as an input unit, a communication interface 15, and the like. The interface is an abbreviation for IF. The control unit 11 is configured to include one or a plurality of ICs including, as a processor, a CPU 11a, a ROM 11b, a RAM 11c, and the like, the other non-volatile memory, and the like.

In the control unit 11, the CPU 11a performs arithmetic processing according to a program stored in the ROM 11b, the other memory, and the like by using the RAM 11c and the like as a work area. The control unit 11 realizes various type of functions of a data processing unit 12a, a resolution conversion unit 12b, a color conversion unit 12c, an HT processing unit 12d, and a recording control unit 12e in cooperation with a program 12 by performing the processing according to the program 12. HT is an abbreviation for halftone. The program 12 may be referred to as an image processing program, a recording control program, a printing control program, and the like. The processor may be configured to perform processing by a plurality of CPUs instead of being limited to a single CPU, and a hardware circuit such as an ASIC, and may be configured to perform processing in cooperation between a CPU and a hardware circuit.

The display unit 13 is a means for displaying visual information, and is formed of, for example, a liquid crystal display, an organic EL display, and the like. The display unit 13 may be configured to include a display and a driving circuit for driving the display. The operation reception unit 14 is an input means for receiving an operation by a user, and is realized by, for example, a physical button, a touch panel, a mouse, a keyboard, and the like. Of course, the touch panel may be realized as one function of the display unit 13. The display unit 13 and the operation reception unit 14 can be referred to as an operating panel of the image processing device 10.

The display unit 13 and the operation reception unit 14 may be a part of a configuration of the image processing device 10, but may be a peripheral device external to the image processing device 10. The communication IF 15 is a generic term for one or a plurality of IFs for the image processing device 10 to communicate with the outside in a wired or wireless manner in conformity with a predetermined communication protocol including a known communication standard. The control unit 11 communicates with the printer 20 via the communication IF 15.

The printer 20 performs recording on a recording medium S under control by the image processing device 10.

Figure 2:
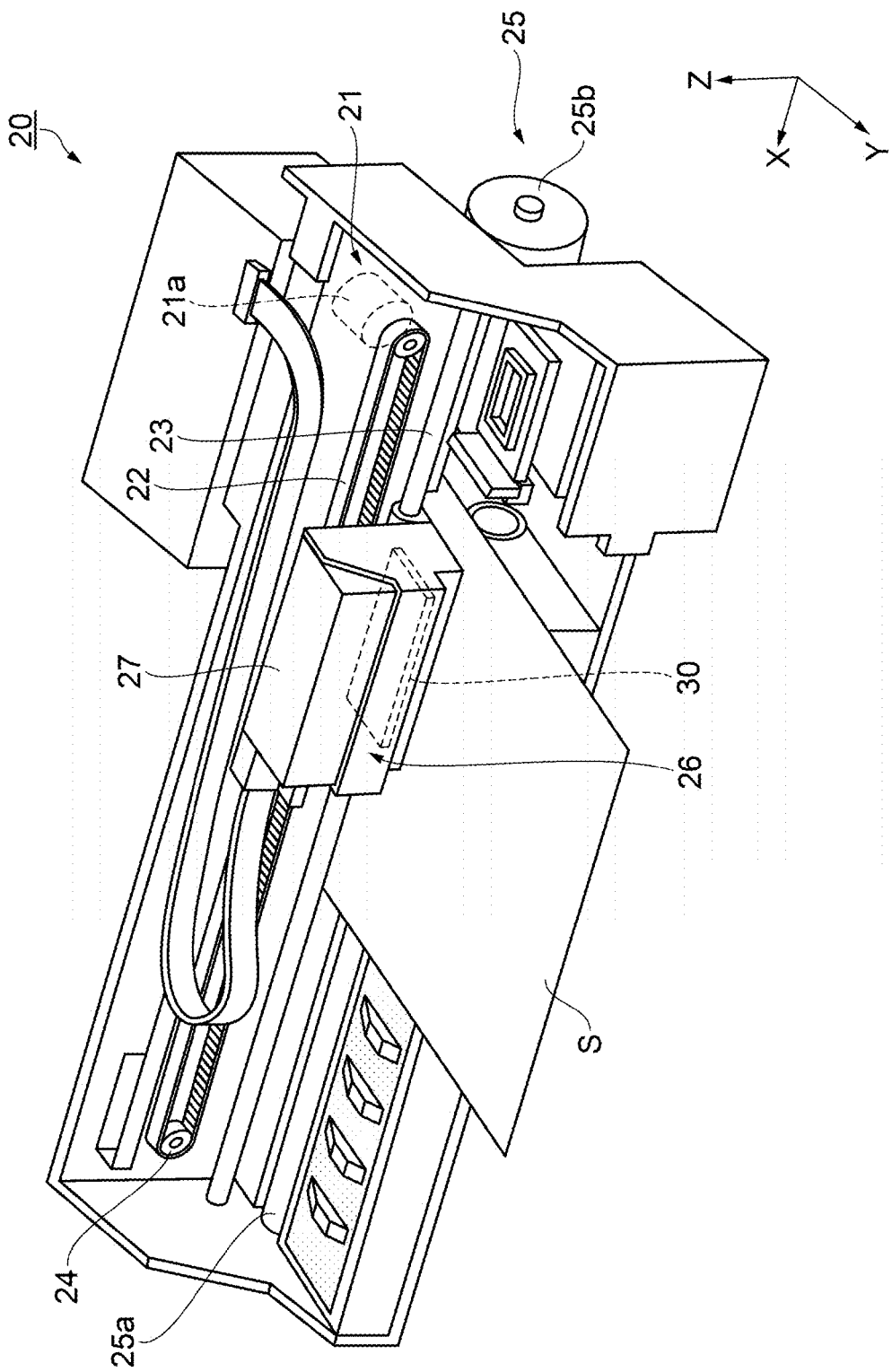
FIG. 2 is a perspective view illustrating a configuration of a recording device.

As illustrated in FIG. 2, the printer 20 is an inkjet printer that discharges a liquid such as an ink and performs the recording. Note that, in coordinates illustrated in the drawings, three imaginary axes orthogonal to each other are referred to as an X-axis, a Y-axis, and a Z-axis. Both directions along the X-axis correspond to a main scanning direction, and the Y-axis corresponds to a sub scanning direction.

The printer 20 includes a recording head 30 that discharges an ink onto the recording medium S, a main scanning mechanism 21 that reciprocates, in the main scanning direction, a carriage 26 on which the recording head 30 is mounted, a sub scanning mechanism 25 that transports the recording medium S in the sub scanning direction, and the like. On the carriage 26, the recording head 30 that discharges the ink onto the recording medium S and a cartridge 27 that accommodates the ink to be supplied to the recording head 30 are mounted.

The main scanning mechanism 21 includes a circular driving belt 22 that spans a pair of pulleys 24, a motor 21a for rotating the driving belt 22 to which the carriage 26 is fixed, and the like. The carriage 26 and the recording head 30 mounted on the carriage 26 are guided to a spanning guide rod 23 by power of the motor 21a, and reciprocate in the main scanning direction along the X-axis.

The sub scanning mechanism 25 includes a roller 25a that transports the recording medium S, a motor 25b for driving the roller 25a, and the like, and transports the recording medium S in the sub scanning direction intersecting the main scanning direction. In other words, the printer 20 records an image represented by recording data on the recording medium S by a combination of a liquid discharge operation associated with a movement of the recording head 30 by the main scanning mechanism 21 and a transport of the recording medium S by the sub scanning mechanism 25.

Figure 3:
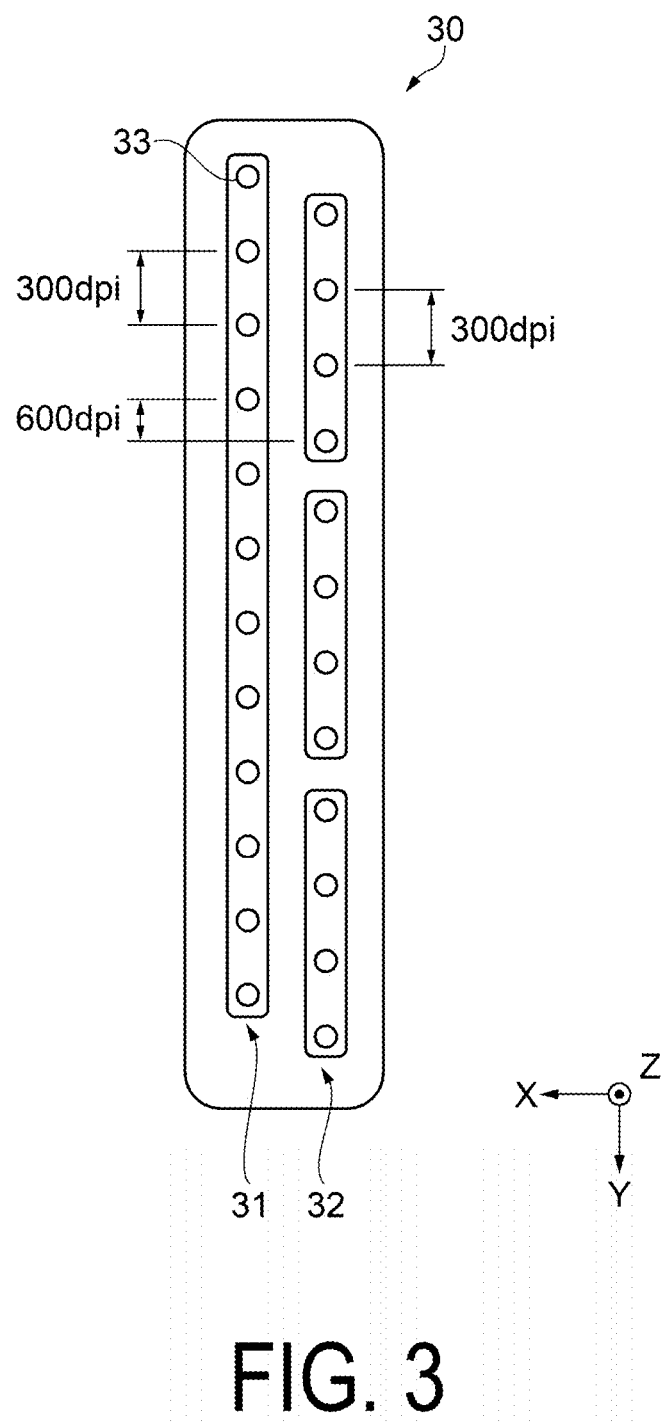
FIG. 3 is a plan view illustrating an arrangement of a recording head.
Figure 4:
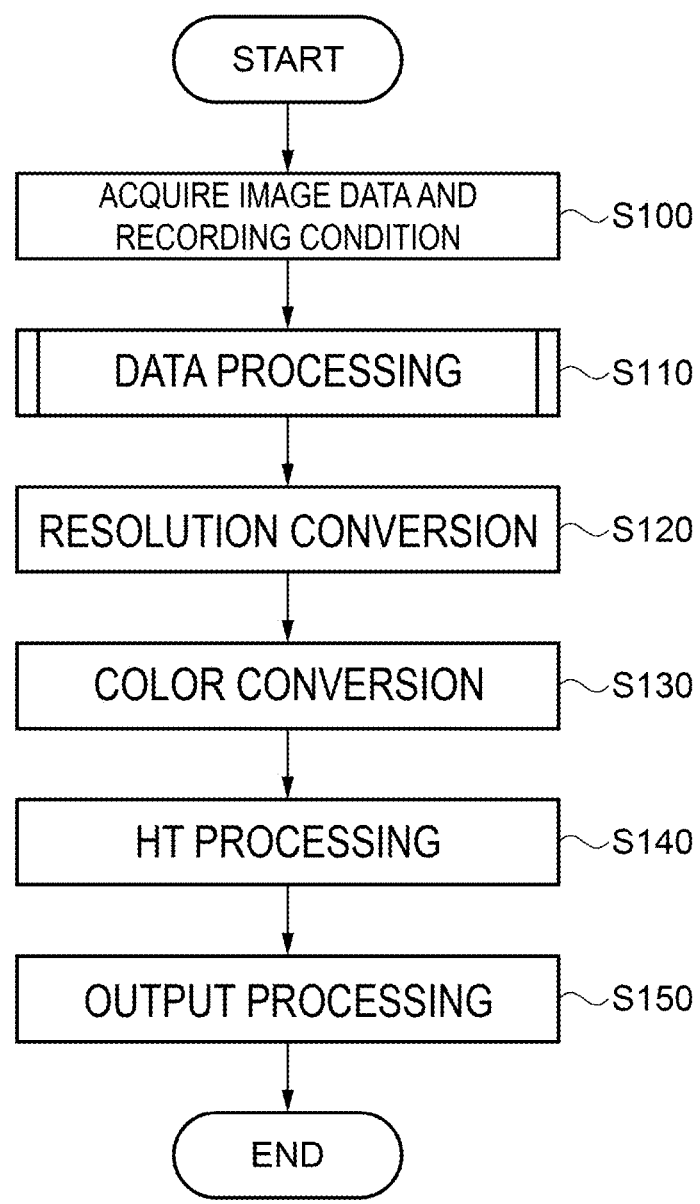
FIG. 4 is a flowchart illustrating an image processing method.

As illustrated in FIG. 3, the recording head 30 includes a plurality of nozzles 33 capable of discharging a dot being a droplet, and discharges the dot from each of the nozzles onto the recording medium S transported by the sub scanning mechanism 25. The printer 20 according to the present exemplary embodiment discharges the dots having different sizes of, for example, S, M, and L from each of the nozzles 33. Note that, in FIG. 3, for convenience of explanation, a position of each of the nozzles 33 is illustrated when the recording head 30 is viewed from above.

The recording head 30 includes a first nozzle row 31 in which a group of nozzles for a black ink including the nozzles aligned at an interval of X dpi is arranged in the sub scanning direction, and a second nozzle row 32 in which a group of nozzles for a plurality of color inks including the nozzles aligned at an interval of X dpi is arranged in the sub scanning direction. The groups of nozzles arranged in the first and second nozzle rows 31 and 32 described in the present exemplary embodiment each include the nozzles aligned at an interval of 300 dpi. The first nozzle row 31 and the second nozzle row 32 are arranged such that nozzle positions in the sub scanning direction are offset from each other in a staggered manner. In this way, the nozzle interval between the black ink and the color ink is 600 dpi. The second nozzle row 32 is formed of the groups of nozzles for cyan, magenta, and yellow.

The recording medium S is typically a sheet, but may be a medium made of a material other than paper as long as the medium allows recording by a liquid. The image processing device 10 generates recording data that can be recorded by the printer 20 based on image data of an input image being input. The printer 20 records the input image on the recording medium S by controlling the main scanning mechanism 21, the sub scanning mechanism 25, the recording head 30, and the like based on the recording data.

The image processing device 10 and the printer 20 may be coupled through a network (not illustrated). In addition to a printing function, the printer 20 may be a multifunction machine having a plurality of functions such as a function as a scanner and a facsimile communication function. The image processing device 10 may be realized not only by a single independent information processing device, but also by a plurality of information processing devices communicatively coupled to each other via a network. For example, among various types of functions of the control unit 11 illustrated in FIG. 1, a device that realizes the data processing unit 12a, and a device that realizes the resolution conversion unit 12b, the color conversion unit 12c, the HT processing unit 12d, and the recording control unit 12e may be separated.

Alternatively, the image processing device 10 and the printer 20 may be an integrated recording device. In other words, the recording system 40 may be a single recording device including the image processing device 10 and the printer 20 as an actual condition. Therefore, processing performed by the image processing device 10 described below may be interpreted as processing performed by a single recording device.

1-2. Description of Image Processing Method:

Next, the image processing method performed by the image processing device 10 will be described with reference to FIGS. 4 to 11B.

The control unit 11 starts image processing in response to reception of a recording instruction of an input image. In step S100, the control unit 11 acquires, as the input image, image data 50 having a resolution of X×N (N=an integer of two or more) dpi corresponding to the sub scanning direction. In the present exemplary embodiment, it is assumed that the image data 50 having a resolution of X=300 and N=2, that is, 600 dpi corresponding to the sub scanning direction. For example, the user optionally selects an input image and performs the recording instruction of the input image by operating the operation reception unit 14 while viewing a UI screen displayed on the display unit 13. UI is an abbreviation for user interface. The control unit 11 acquires the image data 50 of the input image selected in such a manner from a storage source such as a predetermined memory.

The input image acquired in step S100 is the image data 50 in a bitmap format defining a color of each pixel in a predetermined color system. The predetermined color system herein is referred to as, for example, an RGB (red, green, blue) color system, a CMYK color system, an XYZ color system, an L*a*b* color system, and the like. Note that it is assumed that the image data 50 described below has the RGB color system.

Further, in step S100, the control unit 11 acquires a recording condition of the input image. Similarly to the selection of the input image, the recording condition may be information specified by the user, or information acquired from the printer 20 as information specific to the printer 20. The recording condition includes various types of information, such as a recording mode such as a color mode or a monochrome mode, a type of the recording medium, and the number of recorded copies. Further, the recording condition includes information about a recording resolution. The resolution is the number of pixels per inch.

Figure 5:
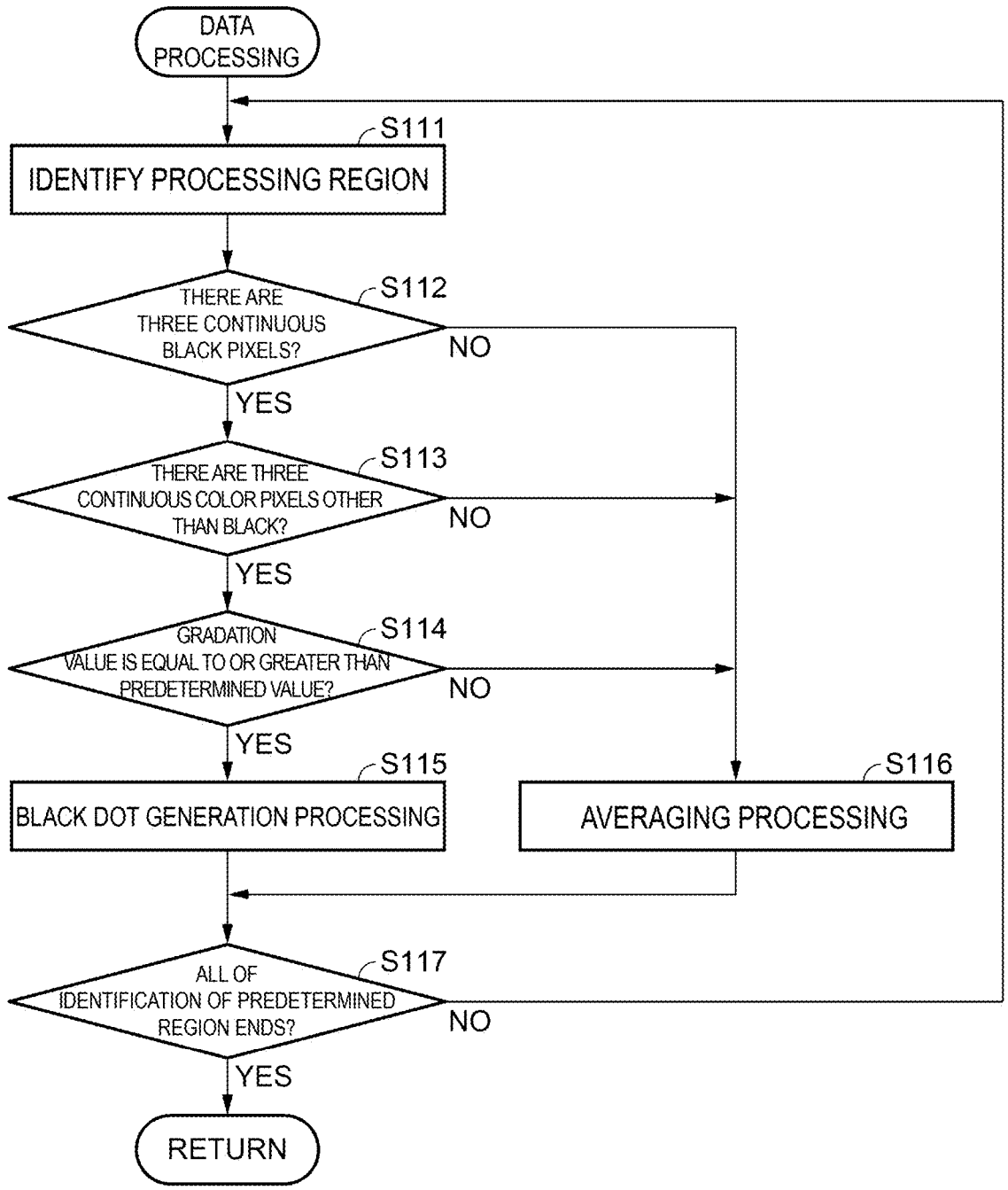
FIG. 5 is a flowchart illustrating details of step S110.
Figure 6:
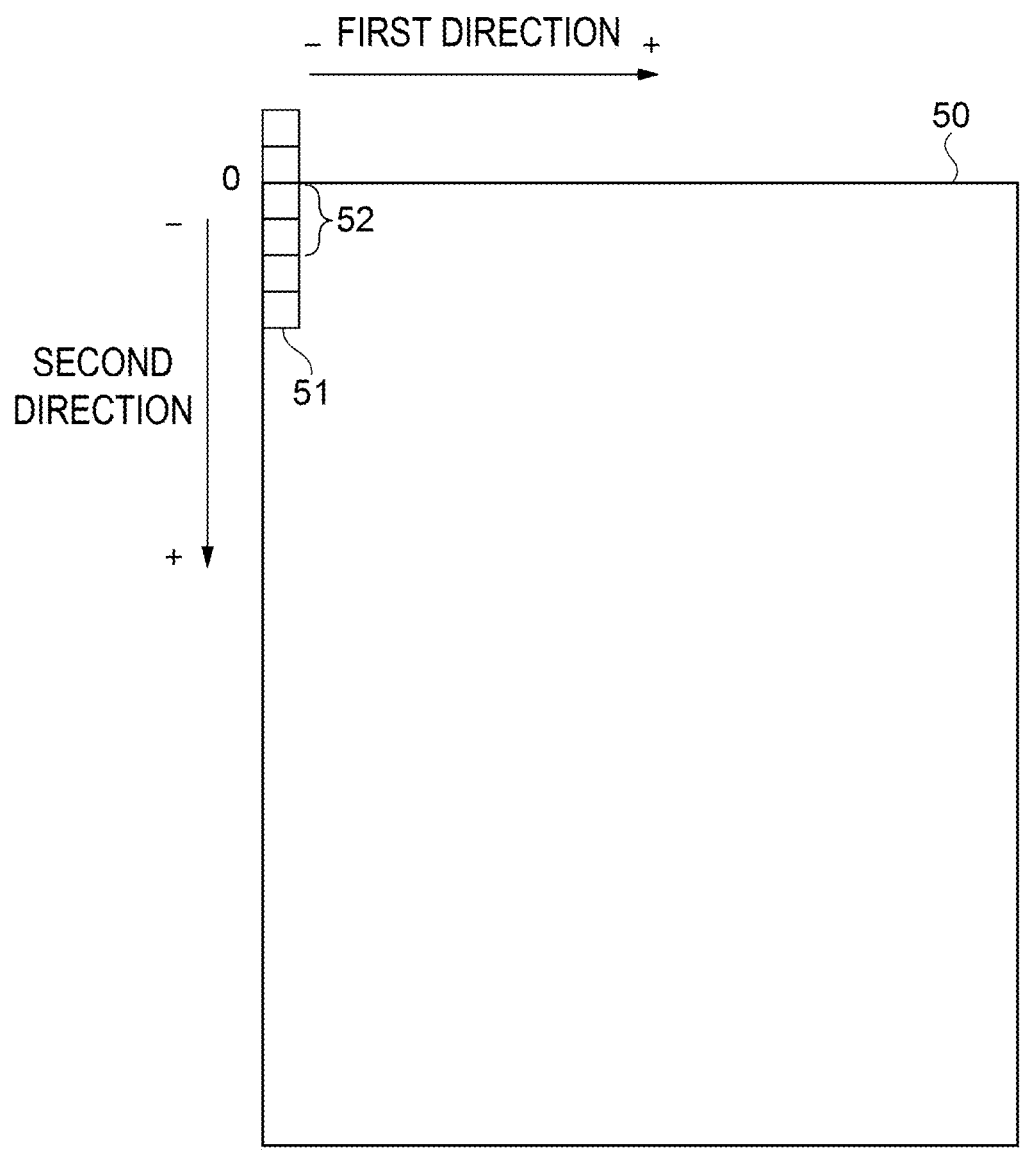
FIG. 6 is a diagram illustrating a processing region and a two-unit region.

In step S110, as illustrated in FIG. 6, the data processing unit 12a performs data processing on the image data 50 for each two-unit region 52. Note that a first direction illustrated in the drawing is a direction of pixels aligned along the main scanning direction when the printer 20 performs recording, and a second direction is a direction of pixels aligned along the sub scanning direction when the printer 20 performs recording. The data processing performed in this step is described in more detail below by using a flowchart illustrated in FIG. 5.

In step S120, the resolution conversion unit 12b performs resolution reduction processing of reducing, to ½, the resolution in the sub scanning direction in the image data 50 after the data processing performed in step S110. In other words, the resolution conversion unit 12b converts the resolution of the image data 50 in the second direction from 600 dpi to 300 dpi. The resolution conversion unit 12b reduces one pixel for each two-unit region 52 that is formed of two pixels aligned in the second direction in the image data 50, and is aligned along the second direction.

In step S130, the color conversion unit 12c performs color conversion processing on the image data 50 after the resolution conversion as a target. In other words, the color system of the image data 50 is converted to a color system of an ink used by the printer 20 for the recording. When the printer 20 is a model that uses a CMYK ink and the image data 50 expresses gradation of a color of each pixel by RGB, a gradation value of RGB for each pixel is converted to a gradation value of CMYK. The gradation value is, for example, a value in a 256 gradation range of 0 to 255. The color conversion processing can be performed by referring to any color conversion look-up table defining a conversion relationship from RGB to CMYK.

In step S140, the HT processing unit 12d generates recording data by performing halftone processing on the image data 50 after the color conversion. A specific technique of the halftone processing is not particularly limited, and a dithering method, an error diffusion method, and the like can be adopted. The recording data defining discharge or non-discharge of a dot of each ink of CMYK for each pixel is generated by the halftone processing. Of course, information about discharge of a dot in the recording data includes information defining which of a plurality of types of dots having different sizes such as an L dot, an M dot, and an S dot is discharged.

In step S150, the recording control unit 12e performs output processing of causing the printer 20 to perform the recording based on the recording data generated in step S140. In other words, the recording control unit 12e sorts the recording data in an order to be transferred to the printer 20, and then sequentially transfers the recording data to the printer 20. The processing of the sorting is also referred to as rasterization processing. Note that steps S130 to S150 correspond to generating the recording data based on the image data 50 having a resolution reduced.

The recording control unit 12e also transmits, to the printer 20, information about the recording condition along with the output recording data. As a result, the printer 20 records, onto the recording medium S, a content represented by the input image by driving the main scanning mechanism 21, the sub scanning mechanism 25, and the recording head 30 based on the information about the recording condition and the recording data transmitted from the image processing device 10.

Details of step S110 will be described with reference to FIG. 5.

In step S111, the data processing unit 12a identifies a processing region 51. The data processing unit 12a processes data for each N-unit region in which N pixels are consecutive in the second direction. The processing region 51 is a region of N+4 pixels including two pixels located at each of both ends of the N-unit region. In the present exemplary embodiment, N=2. In other words, the data processing unit 12a processes the data of the two-unit region 52 located at the center based on information about the processing region 51 of six pixels consecutive along the second direction.

FIG. 6 illustrates a state in which one processing region 51 is identified in step S111. A reference sign 50 refers to the image data 50 of the input image acquired in step S100. Although omitted from FIG. 6, some sort of content such as a ruled line and the like, a photograph, an illustration, and text are represented in the image data 50.

For example, the data processing unit 12a identifies the processing region 51 of six pixels aligned in the second direction such that an origin position "0" in the first direction and the second direction in the image data 50 is a starting position of the two-unit region 52. Each time step S111 is repeated, the data processing unit 12a sequentially shifts, toward a positive side in the first direction by one pixel, the processing region 51 of six pixels aligned in the second direction to form a new processing region 51. Further, when the processing region 51 finishes identifying the processing region 51 to the last pixel row along the first direction, the data processing unit 12a moves the processing region 51 to a positive side in the second direction by two pixels constituting the two-unit region 52, and identifies the new processing region 51 again from the origin in the first direction. Note that dummy pixels of two pixels are arranged at an upper end and a lower end of the image data 50 in the second direction.

In step S112, the data processing unit 12a determines whether there are three consecutive black pixels having a black gradation value in the processing region 51. When there are three consecutive black pixels (step S112: Yes), the processing proceeds to step S113. When there are no three consecutive black pixels (step S112: No), the processing proceeds to step S116.

In step S113, the data processing unit 12a determines whether there are three consecutive color pixels having the same color gradation value in the processing region 51. When there are three consecutive same color pixels (step S113: Yes), the processing proceeds to step S114. When there are not three consecutive same color pixels (step S113: No), the processing proceeds to step S116.

In step S114, the data processing unit 12a determines whether the three consecutive color pixels have a gradation value equal to or greater than a predetermined value when expressed by RGB. When the gradation value is equal to or greater than the predetermined value when expressed by RGB (step S114: Yes), the processing proceeds to step S115. When the gradation value is less than the predetermined value (step S114: No), the processing proceeds to step S116.

In step S115, the data processing unit 12a performs black dot generation processing of generating a black dot in a pixel in the two-unit region 52. This is the processing for generating a dot of the black ink in a pixel after the resolution reduction processing.

In step S116, the data processing unit 12a performs averaging processing of averaging the gradation value of the pixel in the two-unit region 52.

In step S117, the data processing unit 12a determines whether all of the identification of the processing region 51 ends. When the identification ends (step S117: Yes), step S110 ends and the proceeding proceeds to step S120. When the identification does not end (step S117: No), the processing returns to step S111 and repeats from step S111 to step S117.

Here, before description of the data processing in characteristic steps S116 and S117 of the present disclosure, data processing of maintaining the ruled line such that a ruled line represented by one pixel does not disappear when the resolution conversion processing of reducing a resolution of an input image is performed will be described with reference to FIGS. 7A to 7C. In the following description, the ruled line represented by one pixel is also referred to as a one-pixel ruled line. Note that, in each of the drawings, each pixel is indicated by a number with # in order to identify a position of each pixel in the processing region 51 in the second direction.

Figure 7A:
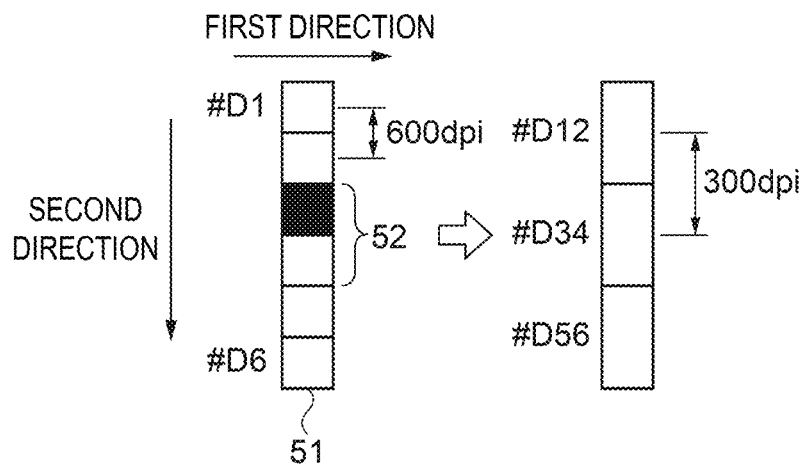
FIG. 7A is a diagram illustrating image data of an input image included in the processing region and the image data after resolution conversion.

FIG. 7A illustrates image data of an input image included in the processing region 51 and the image data after the resolution conversion in order from the left in the drawing.

As illustrated in a left diagram in FIG. 7A, the processing region 51 is formed of pixels of #D1 to #D6. The pixels of #D3 and #D4 are the pixels in the two-unit region 52. When the #D3 pixel is black and the other pixel is a color other than black, the pixel having the same configuration as that of the pixel in the processing region 51 is consecutive in the first direction, and thus the #D3 pixel forms a part of a one-pixel ruled line being a ruled line represented by one pixel. Note that the color of the pixel other than the #D3 pixel is a background color of the one-pixel ruled line. As illustrated in a right diagram in FIG. 7A, for example, when the resolution conversion processing is performed from 600 dpi to 300 dpi by reducing a pixel in an odd row, a #D34 pixel after the reduction is left with information about only the #D4 pixel in an even row, and information about the #D3 pixel that forms the one-pixel ruled line is missing.

Thus, an image processing device in the related art performs data processing of maintaining the one-pixel ruled line.

Figure 7B:
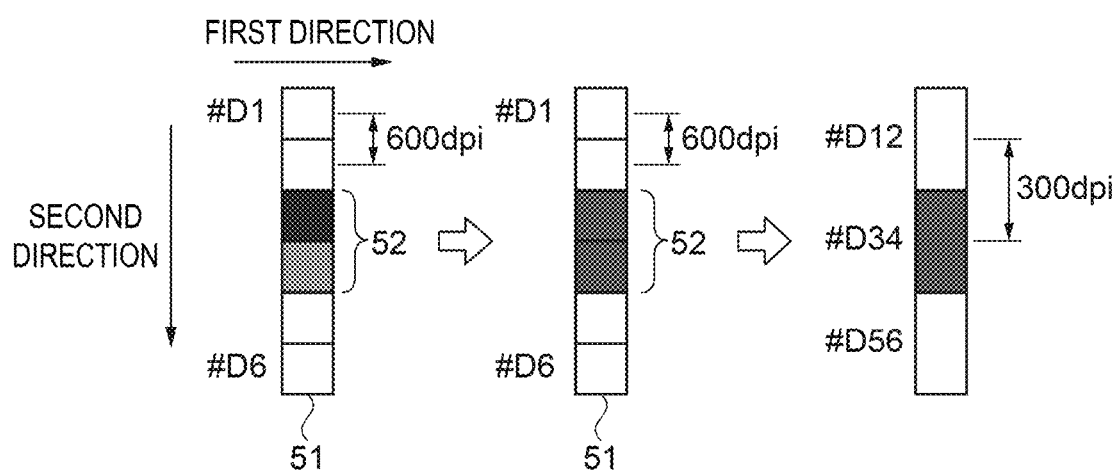
FIG. 7B is a diagram illustrating image data of an input image included in the processing region, the image data after averaging processing, and the image data after the resolution conversion.
Figure 7C:
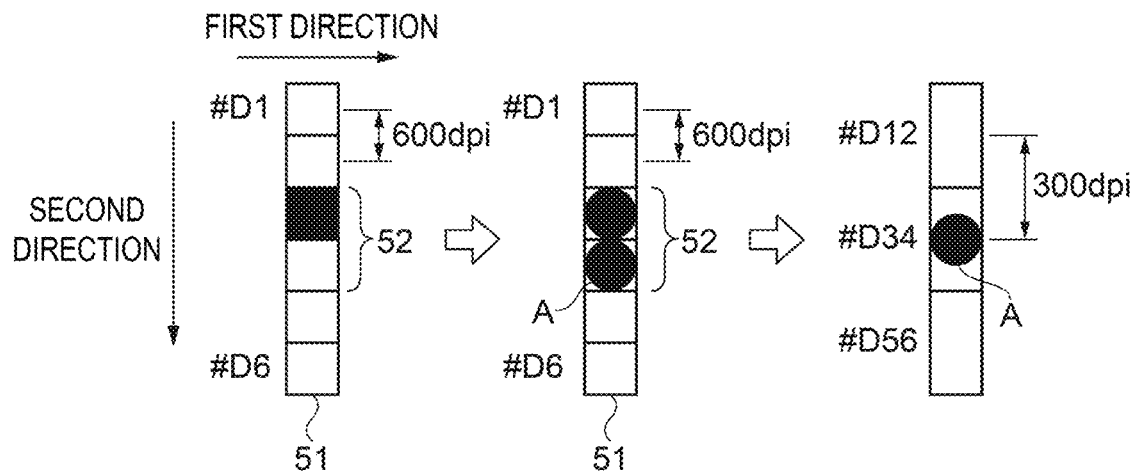
FIG. 7C is a diagram illustrating image data of an input image included in the processing region, the image data after the averaging processing, and the image data after the resolution conversion.

FIGS. 7B and 7C illustrate image data of an input image included in the processing region 51, the image data after the averaging processing, and the image data after the resolution conversion from the left in the drawing. As illustrated in a left diagram in FIG. 7B, when the #D3 pixel and the #D4 pixel in the two-unit region 52 are different colors, the data processing unit performs the averaging processing of averaging a gradation value representing the color of the #D3 pixel and a gradation value representing the color of the #D4 pixel. As illustrated in a middle diagram in FIG. 7B, the #D3 pixel and the #D4 pixel are set with information having a color of the averaged gradation value. In this way, as illustrated in a right diagram in FIG. 7B, even when the resolution conversion that reduces a pixel in an odd row is performed, the #D34 pixel after the reduction retains information about the #D4 pixel having the color of the averaged gradation value.

Further, as illustrated in a left diagram in FIG. 7C, when either pixel of the #D3 pixel or the #D4 pixel in the two-unit region 52 is black and the other pixel is white, the data processing unit sets, in the #D3 pixel and the #D4 pixel, an attribute A that generates a black dot being a dot of the black ink in the above-described HT processing as illustrated in a middle diagram in FIG. 7C. In this way, as illustrated in a right diagram in FIG. 7C, even when the resolution conversion that reduces a pixel in an odd row is performed, a #D34 pixel after the reduction retains information about the #D4 pixel having the attribute A that generates the black dot. In this way, a black ruled line with high contrast is recorded.

However, there is a risk that a ruled line is visible to be thick when the ruled line is recorded by the printer 20 including the recording head 30 in which the first nozzle row 31 for the black ink and the second nozzle row 32 for the color ink are arranged in the staggered manner as illustrated in FIG. 3 by using the data processing according in the related art.

Figure 8A:
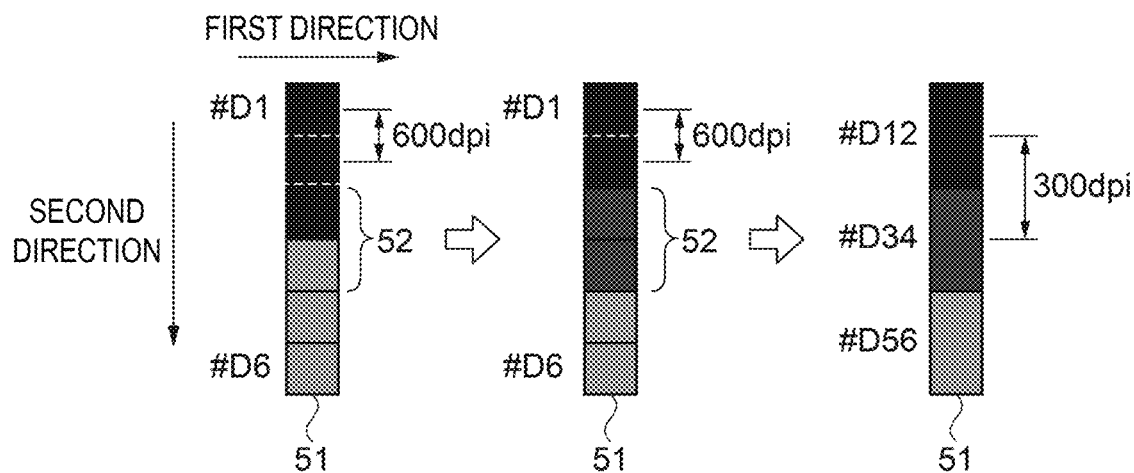
FIG. 8A is a diagram illustrating image data of an input image included in the processing region, the image data after the averaging processing, and the image data after the resolution conversion.

FIG. 8A illustrates image data of an input image included in the processing region 51, the image data after the averaging processing, and the image data after the resolution conversion in order from the left in the drawing.

As illustrated in a left diagram in FIG. 8A, when the #D1 pixel to the #D3 pixel are black and the other pixel is a color other than black, the pixel having the same configuration as that of the pixel in the processing region 51 is consecutive in the first direction, and thus the #D3 pixel forms a part of a three-pixel ruled line being a ruled line represented by three pixels. In this case, as illustrated in a middle diagram in FIG. 8A, the data processing unit performs the averaging processing on the #D3 pixel and the #D4 pixel that are the two-unit region 52, and the #D34 pixel after the reduction retains information about the #D4 pixel having a gradation value close to the averaged black color, as illustrated in a right diagram in FIG. 8A.

Figure 8B:
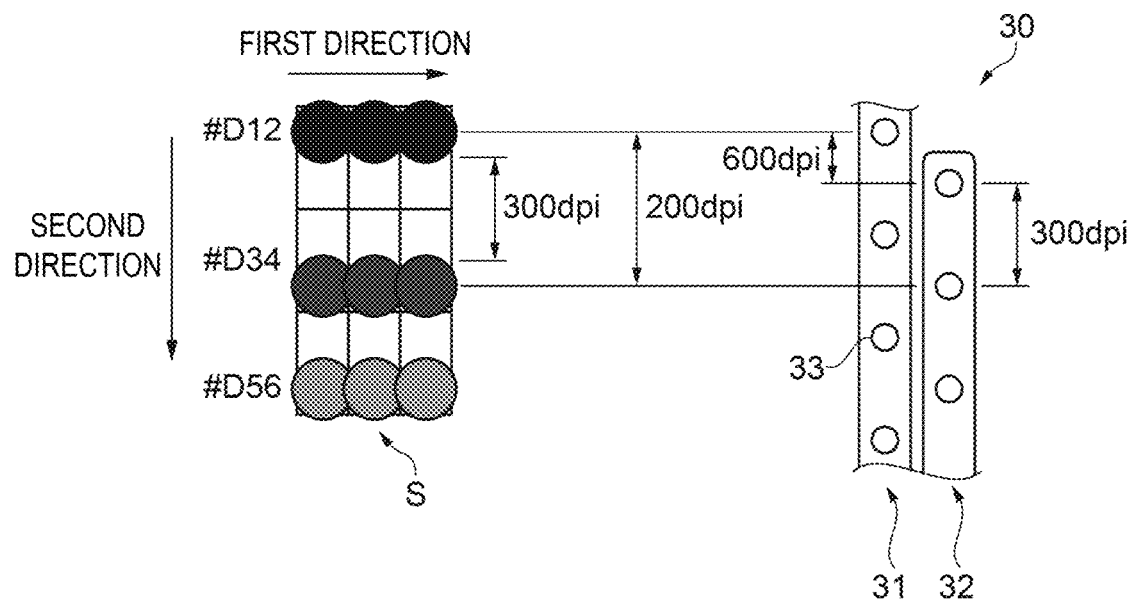
FIG. 8B is a diagram illustrating a position of an ink that lands on a recording medium and a position of a nozzle row that discharges the ink.

FIG. 8B illustrates a position of an ink that lands on the recording medium S and a position of the nozzle row that discharges the ink.

As illustrated in FIG. 8B, an interval and a width of each pixel in the second direction is 300 dpi. An interval between the nozzle 33 of the first nozzle row 31 that discharges the black ink and the nozzle 33 of the second nozzle row 32 that discharges the color ink is 600 dpi. The ink can be discharged, onto each pixel having a width of 300 dpi, from the nozzle 33 of the first nozzle row 31 and the nozzle 33 of the second nozzle row 32 that are separated by 600 dpi. As illustrated in FIG. 8B, in each pixel, the black ink is discharged from the nozzle 33 of the first nozzle row 31 onto a half region on an negative side in the second direction, and the color ink is discharged from the nozzle 33 of the second nozzle row 32 onto a half region on a positive side in the second direction.

The black ink is discharged from the first nozzle row 31 onto a #D12 pixel on the recording medium S by the recording data generated based on the image data after the resolution conversion illustrated in the right diagram in FIG. 8A. In other words, as illustrated in FIG. 8B, the black dot is formed in the half region on the negative side in the second direction in the #D12 pixel. Each ink of cyan, magenta, and yellow is discharged from the second nozzle row 32 onto the #D34 pixel on the recording medium S. In other words, a dot close to black by a composite of cyan, magenta, and yellow is formed in the half region on the positive side in the second direction in the #D34 pixel. Since the black ruled line originally recorded at a 300 dpi interval by using the first nozzle row 31 for the black ink is recorded at a 200 dpi interval by using the first nozzle row 31 for the black ink and the second nozzle row 32 for the color ink, a width of the black ruled line may be visible to be thick.

In a #D56 pixel on the recording medium S, each ink of cyan, magenta, and yellow is discharged from the second nozzle row 32 to form a dot of the background color. The black ruled line is more likely to be visible to be thick when a bright color is set as the background. Even with the black ruled line recorded at the 200 dpi interval, the black ruled line is less likely to be visible to be thick when a dark color is set as the background.

Thus, in the flowchart illustrated in FIG. 5, in step S112, the data processing unit 12a determines whether there are three consecutive black pixels that may become a part of the black ruled line in which there is a risk to be visible to be thick. Further, in step S113, the data processing unit 12a determines whether there are three consecutive pixels other than black that may become the background of the black ruled line. Further, in step S114, the data processing unit 12a determines whether a pixel other than the three consecutive black pixels has a color that makes the black ruled line more likely to be visible to be thick by determining whether the gradation value is equal to or greater than the predetermined value when expressed by RGB.

Then, when the determination in steps S112 to S114 is all "Yes", that is, when the two-unit region 52 is formed of the three consecutive pixels having the black gradation value in the processing region 51, and the three consecutive pixels having the gradation value that is equal to or greater than the predetermined value when expressed by RGB in the processing region 51, the data processing unit 12a performs processing for generating a dot of the black ink in the pixel after the resolution reduction processing.

The data processing in step S115 will be described with reference to FIGS. 9A and 9B.

Figure 9A:
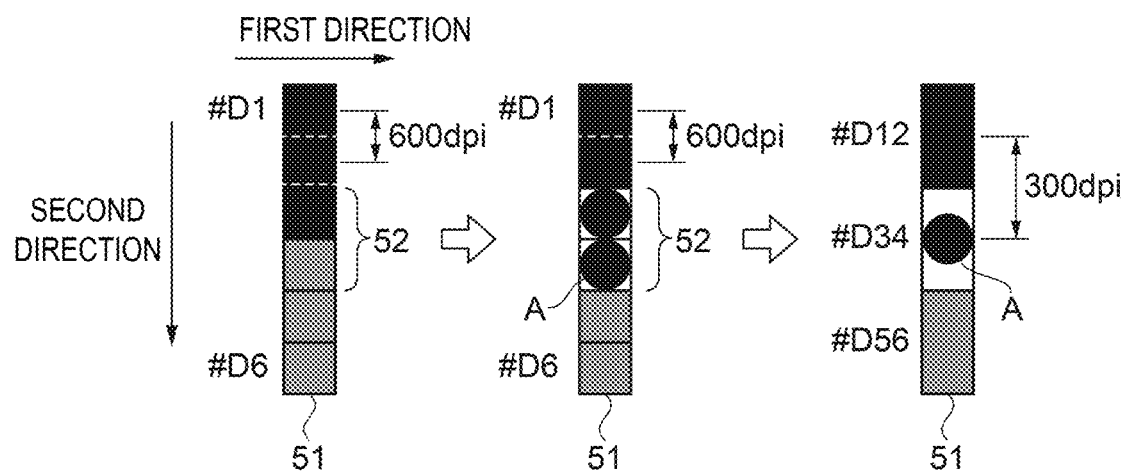
FIG. 9A is a diagram illustrating image data of an input image included in the processing region, the image data after the averaging processing, and the image data after the resolution conversion.

FIG. 9A illustrates the image data of the input image included in the processing region 51, the image data after the averaging processing, and the image data after the resolution conversion in order from the left in the drawing.

As illustrated in a left diagram in FIG. 9A, the #D1 pixel to the #D3 pixel in the processing region 51 are pixels having a black gradation value, and the #D4 pixel to the #D6 pixel are pixels other than black having a gradation value that is equal to or greater than a predetermined value when expressed by RGB. In this case, as illustrated in a middle diagram in FIG. 9A, the data processing unit 12a sets the attribute A that generates a black dot in the #D3 pixel and the #D4 pixel that are the two-unit region 52. In this way, as illustrated in a right diagram in FIG. 9A, the #D34 pixel after the resolution reduction processing in the resolution conversion in step S120 retains information about the attribute A, and the black dot is generated in the #D34 pixel in the HT processing in step S140.

Figure 9B:
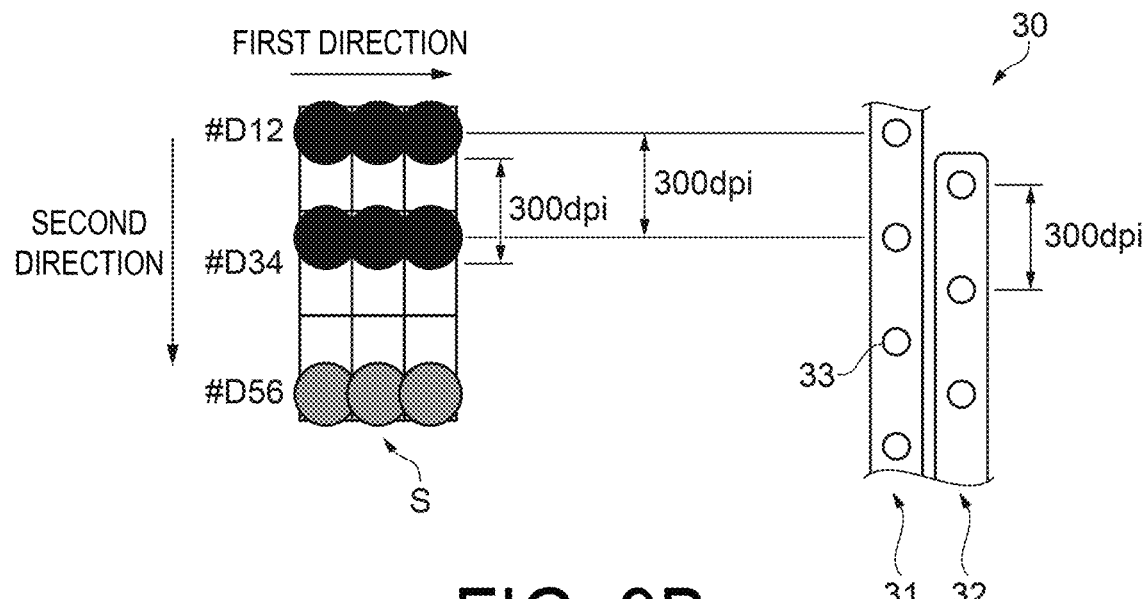
FIG. 9B is a diagram illustrating a position of the ink that lands on the recording medium and a position of the nozzle row that discharges the ink.

FIG. 9B illustrates a position of an ink that lands on the recording medium S and a position of the nozzle row that discharges the ink.

As a result, as illustrated in FIG. 9B, a black ruled line is recorded in the #D12 pixel and the #D34 pixel on the recording medium S only by the nozzle 33 of the first nozzle row 31 having a nozzle pitch of 300 dpi, and thus a width of the black ruled line being visible to be thick is suppressed.

When a dark color is set as the background, it is described that a black ruled line is less likely to be recognized to be thick. However, a harmful influence caused by performing the same processing as that in step S115 when the #D4 pixel to the #D6 pixel are pixels having a dark color and having a gradation value that is less than a predetermined value will be described.

Figure 10A:
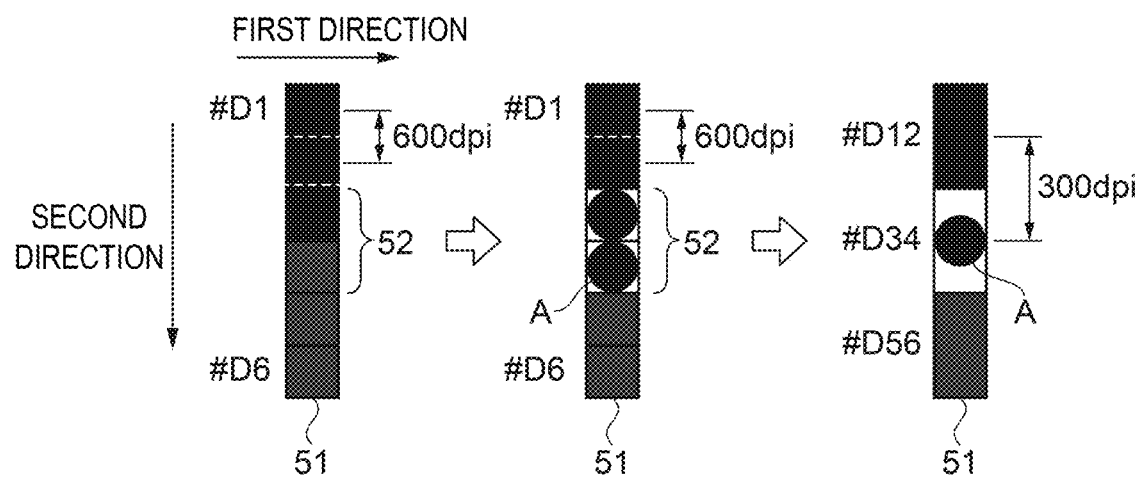
FIG. 10A is a diagram illustrating image data of an input image included in the processing region, the image data after the averaging processing, and the image data after the resolution conversion.

FIG. 10A illustrates image data of an input image included in the processing region 51, the image data after the averaging processing, and the image data after the resolution conversion in order from the left in the drawing.

As illustrated in a left diagram in FIG. 10A, the #D1 pixel to the #D3 pixel in the processing region 51 are pixels having a black gradation value, and the #D4 pixel to the #D6 pixel are pixels other than black having a gradation value that is less than a predetermined value. When the processing in step S115 is performed on the image data, as illustrated in a middle diagram in FIG. 10A, the data processing unit 12a sets the attribute A that generates a black dot in the #D3 pixel and the #D4 pixel that are the two-unit region 52. In this way, as illustrated in a right diagram in FIG. 10A, the #D34 pixel after the resolution reduction processing in the resolution conversion in step S120 retains information about the attribute A, and the black dot is generated in the #D34 pixel in the HT processing in step S140.

Figure 10B:
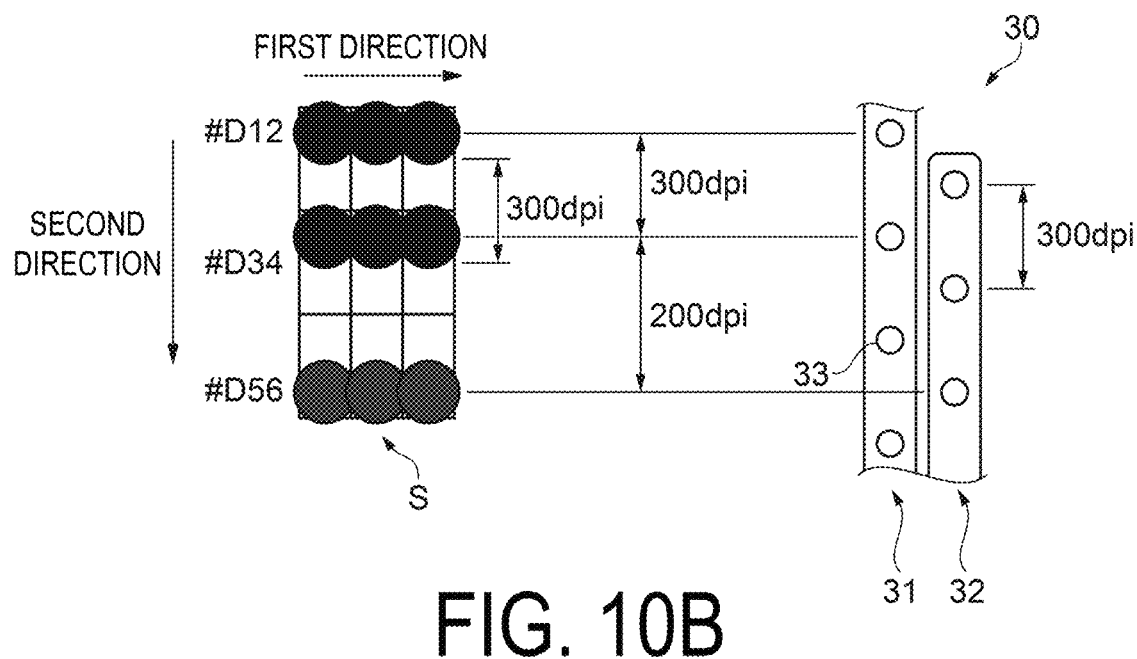
FIG. 10B is a diagram illustrating a position of the ink that lands on the recording medium and a position of the nozzle row that discharges the ink.

FIG. 10B illustrates a position of an ink that lands on the recording medium S and a position of the nozzle row that discharges the ink.

As illustrated in FIG. 10B, a black ruled line is recorded in the #D12 pixel and the #D34 pixel on the recording medium S by the nozzle 33 of the first nozzle row 31 having a nozzle pitch of 300 dpi. On the other hand, each ink of cyan, magenta, and yellow is discharged from the nozzle 33 of the second nozzle row 32 onto the #D56 pixel, and a background of a dark color other than black having a gradation value that is less than a predetermined value is recorded. A black dot that lands on the #D34 pixel and a dot of the background color that lands on the #D56 pixel have a 200 dpi interval greater than an interval between the pixels, and thus a color of the recording medium S may be visible without the landed ink penetrating the entire pixel. Since a color of the recording medium S is normally white, it is more likely to be visible as a white line when a dark color is set as the background.

Thus, in the flowchart illustrated in FIG. 5, in step S114, it is determined whether a pixel other than three consecutive black pixels that may be a background of a black ruled line has a color that makes a white line more likely to be visible to be thick by determining whether the gradation value is equal to or greater than the predetermined value when expressed by RGB.

Then, even in a case in which the determination in step S112 and step S113 is "Yes", when the determination in step S114 is "No", that is, when the two-unit region 52 is formed of the three consecutive pixels having the black gradation value in the processing region 51, and the three consecutive pixels having the gradation value that is less than the predetermined value in the processing region 51, the data processing unit 12a performs processing of changing the gradation value of each pixel to an averaged gradation value.

The data processing in step S116 will be described with reference to FIGS. 11A and 11B.

Figure 11A:
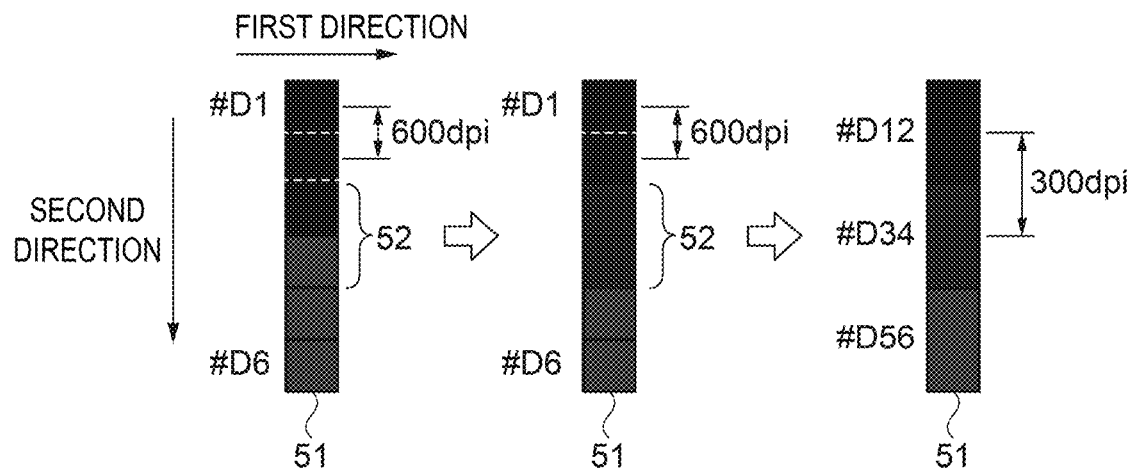
FIG. 11A is a diagram illustrating image data of an input image included in the processing region, the image data after the averaging processing, and the image data after the resolution conversion.

FIG. 11A illustrates image data of an input image included in the processing region 51, the image data after the averaging processing, and the image data after the resolution conversion in order from the left in the drawing.

As illustrated in a left diagram in FIG. 11A, the #D1 pixel to the #D3 pixel in the processing region 51 are pixels having a black gradation value, and the #D4 pixel to the #D6 pixel are pixels other than black having a gradation value that is less than a predetermined value. In this case, as illustrated in a middle diagram in FIG. 11A, the data processing unit 12a changes the gradation value of the #D3 pixel and the #D4 pixel that are the two-unit region 52 to an averaged gradation value. In this way, as illustrated in a right diagram in FIG. 11A, the #D34 pixel after the resolution reduction processing in the resolution conversion in step S120 retains information about the averaged gradation value, and a dot close to black is generated by a composite of cyan, magenta, and yellow in the #D34 pixel in the HT processing in step S140.

Figure 11B:
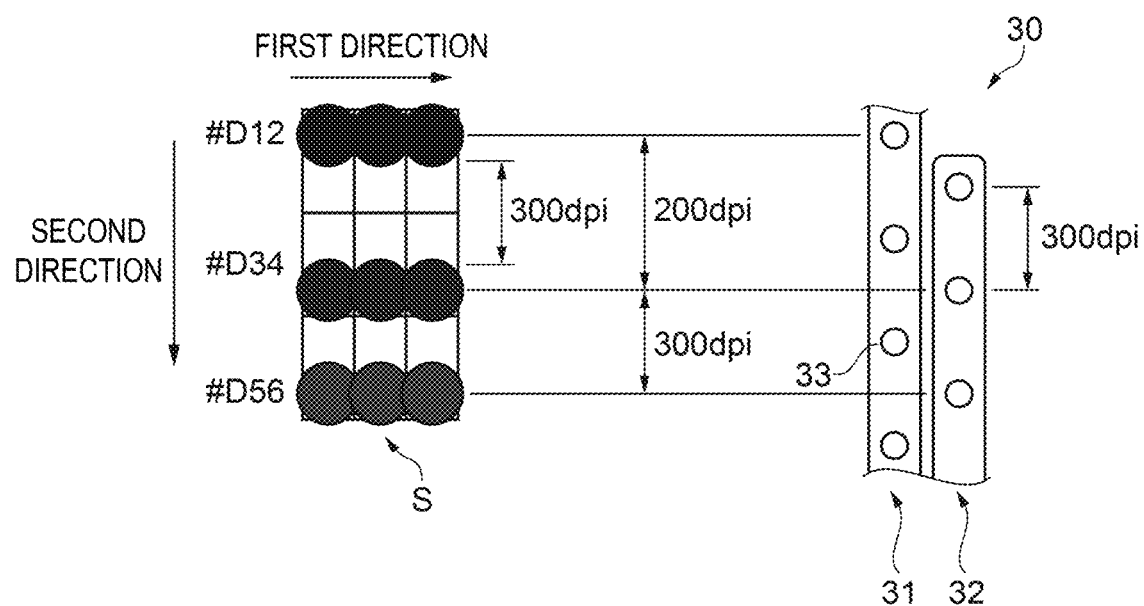
FIG. 11B is a diagram illustrating a position of the ink that lands on the recording medium and a position of the nozzle row that discharges the ink.

FIG. 11B illustrates a position of an ink that lands on the recording medium S and a position of the nozzle row that discharges the ink.

As a result, as illustrated in FIG. 11B, each ink of cyan, magenta, and yellow is discharged, onto the #D34 pixel on the recording medium S, from the nozzle 33 of the second nozzle row 32, and a part of a black ruled line having a color close to black is recorded. Each ink of cyan, magenta, and yellow is discharged from the nozzle 33 of the same second nozzle row 32 onto the #D56 pixel, and a background of a dark color having a gradation value that is less than a predetermined value is recorded. In this way, an interval between a dot of a color close to black that lands on the #D34 pixel and a dot of a background color that lands on the #D56 pixel is 300 dpi that is the same as an interval between the pixels, and thus a white line is less likely to be visible.

Note that, in the present exemplary embodiment, it is described that gradation values of pixels in the two-unit region 52 are averaged in step S116. However, for example, weighted averaging may be used such that a gradation value is weighted so as to approach a lower side of a gradation value of two pixels.

Note that, in the present exemplary embodiment, the case in which the image data 50 is the RGB color system is described, but the other color system may be used. In this case, a determination criterion in step S114 may be obtained by a numerical value used in the other color system.

Further, in the present exemplary embodiment, the case in which a resolution of the image data 50 corresponding to the sub scanning direction in which X=300 and N=2 and X×N=600 dpi is converted to 300 dpi of 1/N is described. However, X and N are not limited to this combination, and the image processing method described in the present exemplary embodiment can also be applied to the other combination.

Further, in the present exemplary embodiment, the group of nozzles for cyan, magenta, and yellow is formed in a single row as the second nozzle row 32, but the other configuration may be used. For example, each of the groups of nozzles for cyan, magenta, and yellow may be formed in three rows aligned in the main scanning direction. In this case, each of the nozzle rows is arranged such that the nozzle positions in the sub scanning direction are offset from each other in the staggered manner with respect to the first nozzle row 31.

The image processing method, the image processing device 10, and the recording system 40 according to the present exemplary embodiment can achieve the following effect.

A black ruled line recorded in the main scanning direction that intersects the sub scanning direction by the first nozzle row 31 and the second nozzle row 32 arranged in the staggered manner is more likely to be visible to be thick when a gradation value equal to or less than a predetermined value, i.e., a bright color is set as the background. The image processing method of the image processing device 10 performs processing of generating a dot of a black ink in a pixel after the resolution reduction processing when the two-unit region 52 is formed of a pixel having a black gradation value and a pixel having a gradation value that is equal to or greater than a predetermined value when expressed by RGB. In this way, the black ruled line is recorded only by the first nozzle row 31, and thus a width of the black ruled line being visible to be thick is suppressed.

A black ruled line recorded in the main scanning direction that intersects the sub scanning direction by the first nozzle row 31 and the second nozzle row 32 arranged in the staggered manner is less likely to be visible to be thick when a gradation value less than a predetermined value, i.e., a dark color is set as the background. Conversely, a ruled line recorded only by the first nozzle row 31 may make a white line more likely to be visible, and image quality may decrease. The image processing method of the image processing device 10 performs processing of changing a gradation value of each pixel to an averaged or weighted averaged gradation value without performing processing of generating a dot of a black ink in a pixel after the resolution reduction processing when the two-unit region 52 is formed of a pixel having a black gradation value and a pixel that is not black and has a gradation value less than a predetermined value. In this way, a white line is less likely to be visible and quality of an image is improved.

A black ruled line recorded in the main scanning direction that intersects the sub scanning direction by the first nozzle row 31 and the second nozzle row 32 arranged in the staggered manner is more likely to be visible to be thick when a gradation value equal to or less than a predetermined value, that is, a bright color is set as the background. The image processing device 10 performs processing of generating a dot of a black ink in a pixel after the resolution reduction processing when the two-unit region 52 is formed of a pixel having a black gradation value and a pixel having a gradation value that is equal to or greater than a predetermined value when expressed by RGB. In this way, the black ruled line is recorded only by the first nozzle row 31, and thus a width of the black ruled line being visible to be thick is suppressed.

The recording system 40 includes the printer 20 including the recording head 30 in which the first nozzle row 31 and the second nozzle row 32 are arranged in the staggered manner, and the image processing device 10 that performs the image processing method for suppresses a width of a black ruled line being visible to be thick even when the black line is recorded by the printer 20. In this way, the recording system 40 in which a width of a black ruled line being visible to be thick is suppressed can be provided.

What is claimed is:

1. An image processing method for generating, based on image data, recording data for a recording device including a recording head in which a first nozzle row and a second nozzle row are arranged in a staggered manner, the first nozzle row including a group of nozzles for a black ink that are aligned at an interval of X dpi and arranged in a sub scanning direction, the second nozzle row including a group of nozzles for a plurality of color inks that are aligned at an interval of X dpi and arranged in the sub scanning direction, the image processing method comprising:
   inputting the image data having a resolution, in the sub scanning direction, of X×N dpi;
   performing data processing on the image data for each N-unit region;
   performing resolution reduction processing of reducing, to 1/N, a resolution in the sub scanning direction in the image data on which the data processing was performed; and
   generating the recording data based on the image data having a resolution reduced, wherein,
   in the data processing, when the N-unit region is formed of a pixel having a black gradation value and a pixel having a gradation value that is equal to or greater than a predetermined value when expressed by RGB, and the pixel having the black gradation value is consecutive from another N-unit region adjacent to the N-unit region, processing of generating a dot of the black ink in a pixel after the resolution reduction processing is performed.

2. The image processing method according to claim 1, wherein,
   in the data processing, when the N-unit region is formed of a pixel having a black gradation value and a pixel that is not black and has a gradation value less than the predetermined value, processing of changing a gradation value of each pixel to an averaged or weighted averaged gradation value is performed.

3. An image processing device configured to generate, based on image data, recording data for a recording device including a recording head in which a first nozzle row and a second nozzle row are arranged in a staggered manner, the first nozzle row including a group of nozzles for a black ink that are aligned at an interval of X dpi and arranged in a sub scanning direction, the second nozzle row including a group of nozzles for a plurality of color inks that are aligned at an interval of X dpi and arranged in the sub scanning direction, the image processing device comprising:
   an input unit configured to receive an input of the image data having a resolution in the sub scanning direction of X×N dpi; and
   a control unit configured to perform data processing on the image data for each N-unit region, perform resolution reduction processing of reducing, to 1/N, a resolution in the sub scanning direction in the image data on which the data processing was performed, and generate the recording data based on the image data having a resolution reduced, wherein,
   when the N-unit region is formed of a pixel having a black gradation value and a pixel having a gradation value that is equal to or greater than a predetermined value when expressed by RGB, and the pixel having the black gradation value is consecutive from another N-unit region adjacent to the N-unit region, the control unit performs processing of generating a dot of the black ink in a pixel after the resolution reduction processing.

4. A recording system, comprising:
   the image processing device according to claim 3; and a recording device configured to perform recording on a recording medium based on the recording data generated by the image processing device.

\* \* \* \* \*